(12) United States Patent
Shum et al.

(10) Patent No.: US 8,667,092 B1
(45) Date of Patent: Mar. 4, 2014

(54) SYSTEM AND METHOD FOR PROVIDING ONLINE FILE MANAGEMENT SERVICES

(75) Inventors: Isaac Quinn Shum, New York, NY (US); Alexey Kalinichenko, San Francisco, CA (US); Micah Lemonik, Great Neck, NY (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 13/274,850

(22) Filed: Oct. 17, 2011

(51) Int. Cl.
G06F 15/16 (2006.01)

(52) U.S. Cl.
USPC ........... 709/219; 709/217; 709/218; 709/214; 709/226; 709/223; 709/229; 709/231; 709/221; 709/238

(58) Field of Classification Search
USPC ......... 709/217–219, 214, 226, 223, 229, 231, 709/221, 238
See application file for complete search history.

(56) References Cited

U.S. PATENT DOCUMENTS

| | | | |
|---|---|---|---|
| 6,675,199 B1 * | 1/2004 | Mohammed et al. | 709/208 |
| 8,032,701 B1 | 10/2011 | Glade et al. | |
| 8,127,307 B1 | 2/2012 | Palekar et al. | |
| 2003/0074453 A1 * | 4/2003 | Ikonen | 709/228 |
| 2009/0112880 A1 * | 4/2009 | Oliveira et al. | 707/10 |
| 2011/0153937 A1 * | 6/2011 | Annamalaisami et al. | 711/118 |

* cited by examiner

*Primary Examiner* — Wing F Chan
*Assistant Examiner* — Padma Mundur
(74) *Attorney, Agent, or Firm* — Wolff & Samson, PC (57) ABSTRACT

A first message comprising first information specifying a file is received from a first server. Respective second messages comprising second information specifying the file are transmitted to a plurality of lock services. Assignment information identifying a file server assigned to handle requests related to the specified file is received from each of the plurality of lock services. One or more conflict resolution rules are applied to reconcile conflicts among the assignment information received from the plurality of lock services and to determine an assigned file server assigned to handle requests related to the specified file. A third message identifying the file server assigned to handle requests related to the specified file is transmitted to the first server.

8 Claims, 5 Drawing Sheets

| | File Identifier | Assigned Server |
|---|---|---|
| 341 | File - 1 | File Server 120-A |
| 342 | File - 2 | File Server 120-B |

SYSTEM AND METHOD FOR PROVIDING ONLINE FILE MANAGEMENT SERVICES

TECHNICAL FIELD

This specification relates generally to systems and methods for providing online services, and more particularly to systems and methods for providing online file management services.

BACKGROUND

The importance of data storage continually increases with the growth in the use of computer networks. One challenge associated with data storage is the need to keep track of and manage stored data. For example, within a communication network in which data files are regularly updated, it is necessary to keep track of changes made to data files and maintain information indicating the most current version of each data file.

SUMMARY OF THE INVENTION

In accordance with an embodiment, a method for providing online services is provided. A first message comprising first information specifying a file is received from a first server. Respective second messages comprising second information specifying the file are transmitted to a plurality of lock services. Assignment information identifying a file server assigned to handle requests related to the specified file is received from each of the plurality of lock services. One or more conflict resolution rules are applied to reconcile conflicts among the assignment information received from the plurality of lock services and to determine an assigned file server assigned to handle requests related to the specified file. A third message identifying the file server assigned to handle requests related to the specified file is transmitted to the first server.

In one embodiment, the first message specifies the file and requests information identifying a file server assigned to handle requests related to the specified file.

In another embodiment, a majority wins conflict resolution rule is applied to determine the file server assigned to handle requests related to the specified file, if a first lock service identifies a first file server assigned to handle requests related to the specified file and a second lock service identifies a second file server assigned to handle requests related to the specified file.

In another embodiment, respective second messages comprising second information specifying the file are transmitted to five lock services. a fourth message identifying the file server assigned to handle requests related to the specified file may be transmitted to the plurality of lock services. The file may include one of: a text document, a spreadsheet, a drawing, a design document, a video file, and an audio file.

These and other advantages of the present disclosure will be apparent to those of ordinary skill in the art by reference to the following Detailed Description and the accompanying drawings.

DETAILED DESCRIPTION

Figure 1:
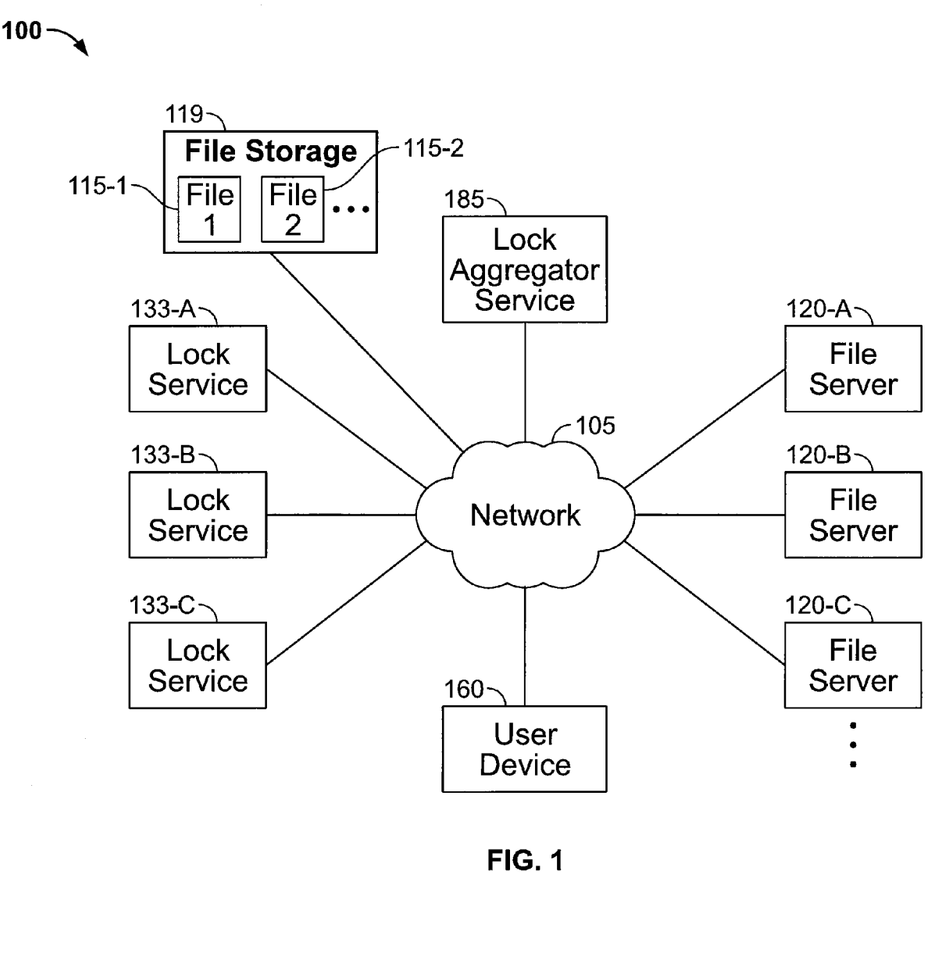
FIG. 1 shows a communication system that may be used to provide online services in accordance with an embodiment.

FIG. 1 shows a communication system 100 that may be used to provide online services, in accordance with an embodiment. Communication system 100 comprises a network 105, a lock aggregator service 185, a plurality of file servers 120-A, 120-B, 120-C, etc., a plurality of lock services 133-A, 133-B, 133-C, etc., a file storage 119, and a user device 160. For convenience, the term "file server 120" is sometimes used herein to refer to any one of file servers 120-A, 120-B, 120-C, etc. Accordingly, any discussion herein referring to "file server 120" is equally applicable to each of file servers 120-A, 120-B, 120-C, etc. Similarly, for convenience, the term "lock service 133" is sometimes used herein to refer to any one of lock services 133-A, 133-B, 133-C, etc. Accordingly, any discussion herein referring to "lock service 133" is equally applicable to each of lock services 133-A, 133-B, 133-C, etc.

In the exemplary embodiment of FIG. 1, network 105 is the Internet. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

File storage 119 stores one or more data files and/or other types of information. For example, file storage may store text documents, spreadsheets, drawings, design documents, video or audio files, etc. In the illustrative embodiment of FIG. 1, file storage 119 stores a plurality of files including File-1 (115-1), File-2 (115-2), etc. File storage 119 may include any type of storage mechanism such as disk drives, optical disks, tape drives, etc.

User device 160 may be any device that enables a user to communicate via network 105. User device 160 may be connected to network 105 through a direct (wired) link, or wirelessly. User device 160 may have a display screen for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
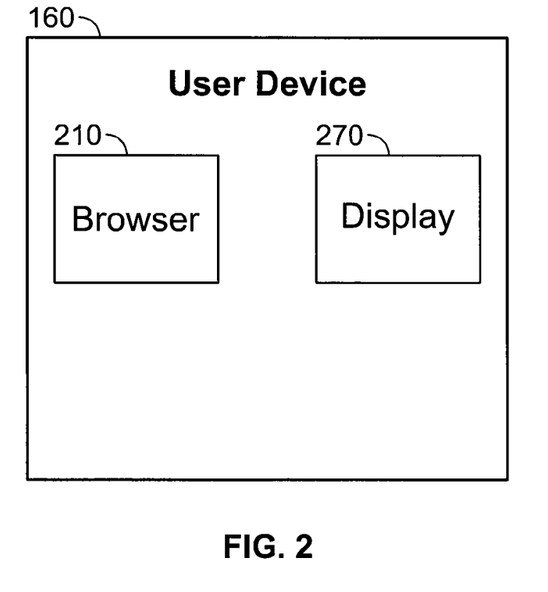
FIG. 2 shows functional components of an exemplary user device.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays files, documents, images, Web pages, and other information. For example, all or a portion of a document may be displayed on display 270.

File server 120 provides file management services to user device 160. For example, file server 120 may receive from user device 160 a request to access a particular file stored in file storage 119. If file server 120 determines that it is responsible for handling requests relating to the particular file, file server 120 may determine the storage location of the particular file in file storage 119, and then enable user device 160 to access the file. In one embodiment, file server 120 may retrieve a copy of the requested file and provide the copy of the file to user device 160. If a user makes a change to the file while accessing the file, file server 120 may receive the change, access the stored file, and update the file based on the changes.

From time to time, a file server 120 may receive from a user device a request to access a particular file, but determine that it does not hold the responsibility for responding to requests related to that particular file. The file server that receives the request may have information identifying another file server that is assigned to handle requests related to that file. In such case, the request may be forwarded to the file server assigned to handle requests related to the file. However, in other embodiments, the file server that receives the request may not have information indicating which file server is assigned to handle requests related to that particular file. In such event, in some embodiments, the file server may retry the request.

Figure 3A:
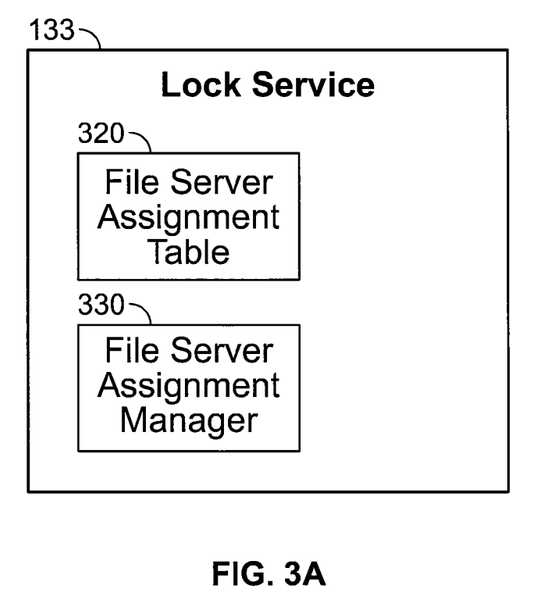
FIG. 3A shows functional components of a lock service in accordance with an embodiment.

Lock service 133 maintains information identifying files stored in file storage 119 and information identifying, for each such file, a file server assigned to handle requests pertaining to the file. FIG. 3A shows functional components of lock service 133 in accordance with an embodiment. Lock service 133 includes a file server assignment manager 330 and a file server assignment table 320. File server assignment manager 330 from time to time receives an inquiry pertaining to a specified file and consults file server assignment table 320 to determine a file server that is assigned to handle requests pertaining to the specified file.

Figure 3B:
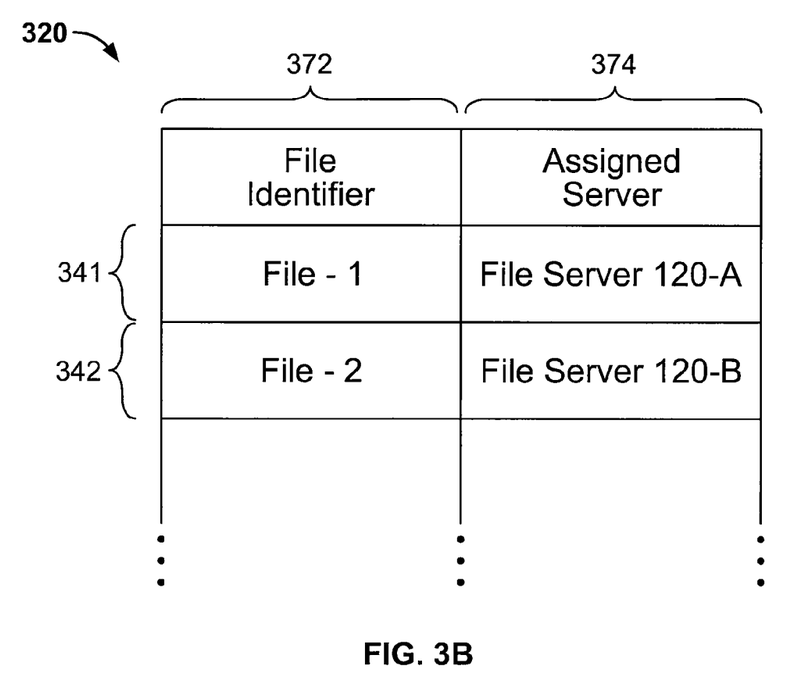
FIG. 3B shows an example of a file server assignment table in accordance with an embodiment.

FIG. 3B shows an example of a file server assignment table in accordance with an embodiment. File server assignment table 320 includes a column 372 which stores an identifier of a particular file, and a column 374 which identifies a file server assigned to handle requests for the particular file. For example, row 341 indicates that requests related to File-1 are handled by File Server 120-A; row 342 indicates that requests related to File-2 are handled by File Server 120-B.

Referring again to FIG. 3A, when lock service 133 receives an inquiry specifying a particular file which is not currently listed in file server assignment table 320, file server assignment manager 330 assigns a file server 120 to handle requests related to the file, and adds an entry in file server assignment table 320 to record the assignment. File server assignment manager 330 sends a notification message to the assigned file server indicating the assignment. The assigned file server may then notify other lock services of the assignment.

Referring again to FIG. 1, communication system 100 includes a plurality of lock services 133. Because each lock service 133 maintains its own file server assignment table 320 to keep track of assignments, from time to time the information maintained in the assignment table of a first lock service 133 may conflict with the information maintained in the assignment table of a second lock service 133. For example, a first lock service 133 may store information indicating that requests for a particular file are to be handled by File Server 120-A, while a second lock service 133 may maintain information indicating that requests for that particular file are to be handled by File server 120-C.

In accordance with an embodiment, lock aggregator service 185 provides polling and conflict resolution functions to determine server assignment information and to prevent conflicts. Lock aggregator service 185 from time to time receives an inquiry relating to a particular file and contacts a plurality of lock services 133 for the identity of the file server that is assigned to handle requests related to the file. Lock aggregator service 185 receives assignment information from the lock services 133 and applies conflict resolution rules as necessary to resolve any conflicts within the information received.

Figure 4:
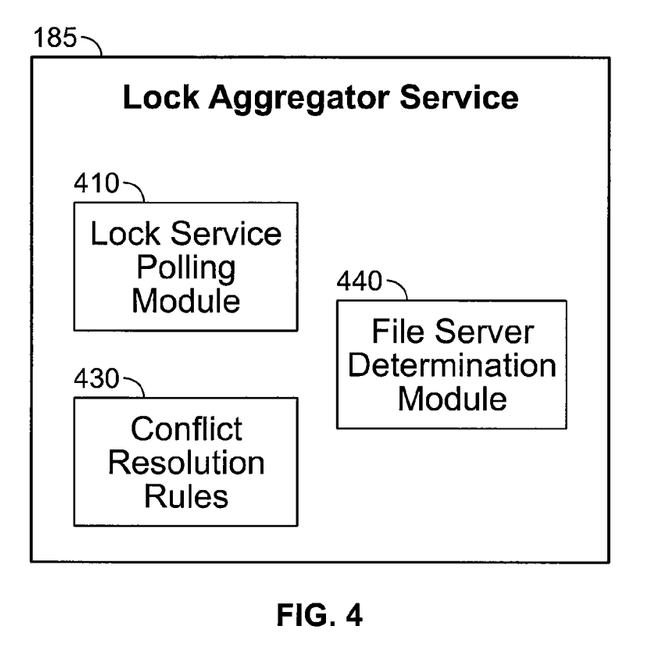
FIG. 4 shows components of a lock aggregator service in accordance with an embodiment.

FIG. 4 shows components of lock aggregator service 185 in accordance with an embodiment. Lock aggregator service 185 includes a lock service polling module 410, a file server determination module 440, and conflict resolution rules 430. In response to an inquiry received from a file server and pertaining to a particular file, lock service polling module 410 communicates with a plurality of lock services 133 to obtain information identifying a file server assigned to handle requests related to the file. File server determination module 440 analyzes the information received from the plurality of lock services 133, applies conflict resolution rules 430 to resolve any conflicts, and determines a file server assigned to handle requests related to the file. Conflict resolution rules 430 apply logic that determines a single file server responsible for requests related to a particular data file when a first lock service indicates that a first file server is responsible for requests related to the data file and a second lock service indicates that a second, different, file server is responsible for requests related to the data file. In one embodiment, conflict resolution rules are implemented in code.

In accordance with an embodiment, lock aggregator service 185 from time to time provides file management services to facilitate access to stored files. Suppose, as an illustrative example, that a user employing user device 160 wishes to access File-1. The user inputs appropriate information into user device 160, and user device 160 transmits to a file server a request to access File-1. In this example, suppose that user device 160 transmits a request to file server 120-C. File server 120-C receives the request and transmits to lock aggregator service 185 a message asking for information specifying a file server that is assigned to handle requests related to File-1.

Figure 5:
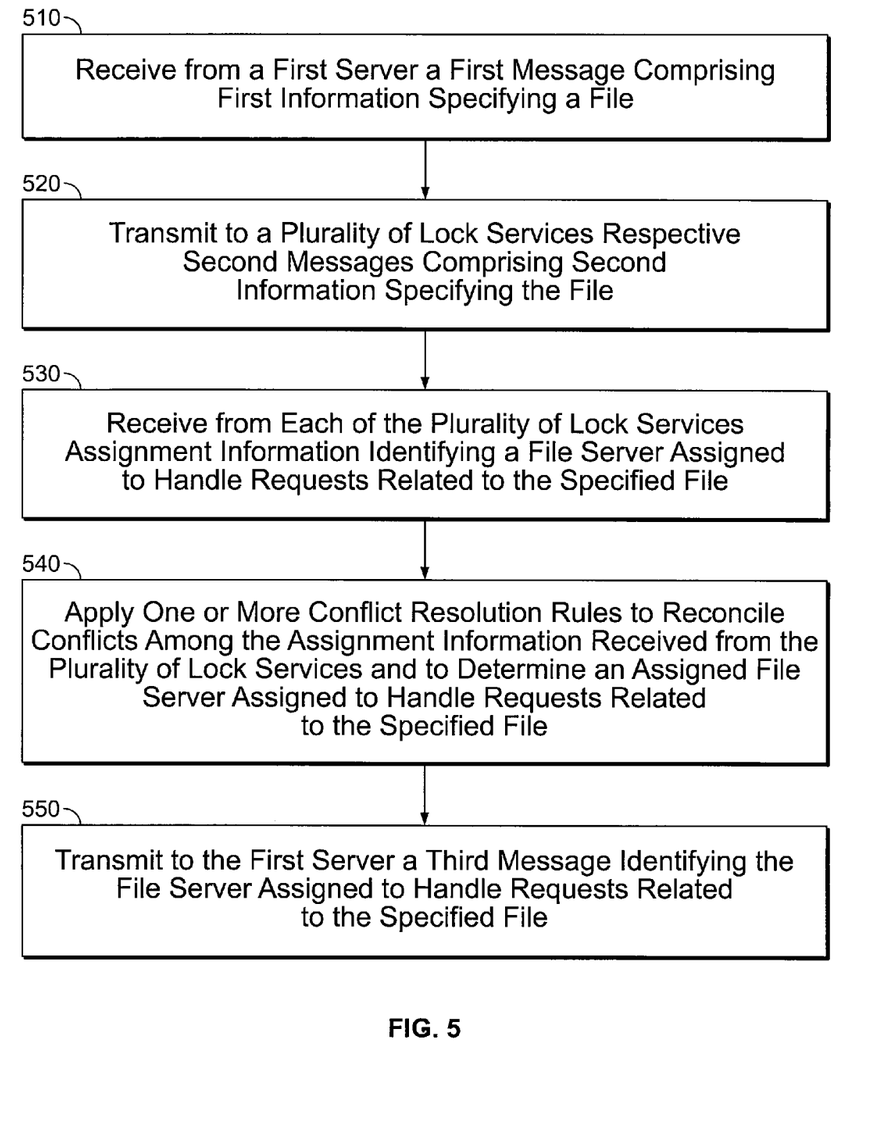
FIG. 5 is a flowchart of a method of providing data management services in accordance with an embodiment.

FIG. 5 is a flowchart of a method for providing file management services in accordance with an embodiment. At step 510, a first message comprising first information specifying a file is received from a first server. Thus, lock aggregator service 185 receives the message from file server 120-C asking for information specifying a file server that is assigned to handle requests related to File-1.

At step 520, respective second messages comprising second information specifying the file are transmitted to a plurality of lock services. Lock aggregator service 185, in response to the message from file server 120-C, transmits to a plurality of lock services 133 a second message that identifies File-1 and asks for information identifying the file server that is assigned to handle requests related to File-1. In the illustrative embodiment of FIG. 4 lock service polling module 410 (of lock aggregator service 185) transmits the second message to five lock services 133. In other embodiments, the second message may be transmitted to more or fewer than five lock services.

Each lock service 133 receives the second message identifying File 1 and accesses its respective file server assignment table 320 to determine a file server assigned to handle requests related to File 1. For example, lock service 133-A may consult its respective file server assignment table 320 and determine that File Server 120-A is assigned to handle requests related to FILE-1. Each lock service 133 transmits to lock aggregator service 185 assignment information identifying the file server assigned to handle requests related to File-1.

At step 530, assignment information identifying a file server assigned to handle requests related to the specified file is received from each of the plurality of lock services. Lock aggregator service 185 receives the assignment information transmitted by each respective lock service 133. In the illustrative embodiment of FIG. 4, lock service polling module 410 receives such assignment information and forwards it to file server determination module 440.

If all of the assignment information received from lock services 133 is consistent and clearly identifies a file server assigned to handle requests related to File 1, the method proceeds to step 550. However, from time to time a first lock service 133 may identify a first file server 120 as being responsible for handling requests related to a particular file while a second lock service 133 identifies a second file server 120 as being responsible for handling requests related to the particular file. In such event, the method proceeds to step 540.

At step 540, one or more conflict resolution rules are applied to reconcile conflicts among the assignment information received from the plurality of lock services and to determine the file server assigned to handle requests related to the specified file. Accordingly, file server determination module 440 accesses conflict resolution rules 430 and applies one or more appropriate conflict resolution rules to the assignment information to determine a single file server that is responsible for handling requests related to File 1. For example, file server determination module 440 may apply a "majority wins" rule if three lock services identify a first file server as being assigned to handle requests related to File 1, and two lock services identify a second file server as being assigned to handle requests related to File 1. In one embodiment, file server determination module 440 may identify a file server assigned to handle requests relating to a particular file without receiving responses from all lock services to which the query message was sent, if it is determined that a majority of the lock services queried identify the same file server. For example, if the query message is sent to five lock services, and only three lock services reply identifying file server 120-A as the responsible file server, file server determination module 440 may determine that file server 120-A is the assigned server based on the three responses received.

Suppose, in the illustrative embodiment, that file server determination module 440 applies conflict resolution rules, as appropriate, and determines that file server 120-A is assigned to handle requests related to File 1. At step 550, a third message identifying the file server assigned to handle requests related to the specified file is transmitted to the first server. Accordingly, lock aggregator service 185 transmits to file server 120-C a message identifying file server 120-A as being assigned to handle requests related to File 1. File server 120-C may now forward the original request received from user device 160 to File server 120-A. File server 120-A receives the request and enables user device 160 to access File-1.

In one embodiment, lock aggregator service 185 may additionally transmit a message to all lock services 133 identifying file server 120-A as being assigned to handle requests related to File-1. Alternatively, lock aggregator service 185 may transmit a message identifying file server 120-A as being assigned to handle requests related to File-1 only to those lock services which provided assignment information inconsistent with the final determination (e.g., any lock service that identified file server 120-B or 120-C). Each lock service 133 may receive the message and update its respective file server assignment table, as necessary.

In various embodiments, the method steps described herein, including the method steps described in FIG. 5, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
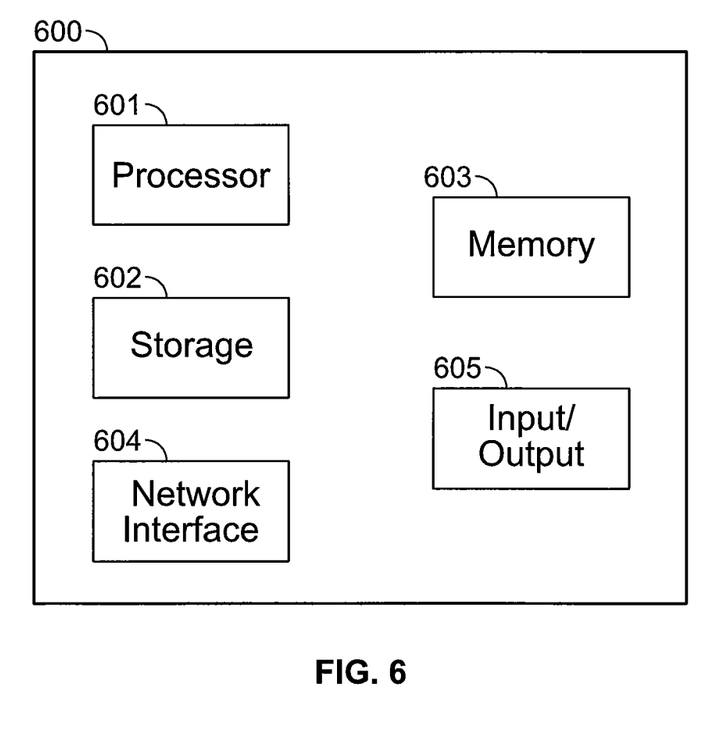
FIG. 6 shows components of a computer that may be used to implement the invention.

A high-level block diagram of an exemplary computer that may be used to implement systems, apparatus and methods described herein is illustrated in FIG. 6. Computer 600 comprises a processor 601 operatively coupled to a data storage device 602 and a memory 603. Processor 601 controls the overall operation of computer 600 by executing computer program instructions that define such operations. The computer program instructions may be stored in data storage device 602, or other computer readable medium, and loaded into memory 603 when execution of the computer program instructions is desired. Thus, the method steps of FIG. 5 can be defined by the computer program instructions stored in memory 603 and/or data storage device 602 and controlled by the processor 601 executing the computer program instructions. For example, the computer program instructions can be implemented as computer executable code programmed by one skilled in the art to perform an algorithm defined by the method steps of FIG. 5. Accordingly, by executing the computer program instructions, the processor 601 executes an algorithm defined by the method steps of FIG. 5. Computer 600 also includes one or more network interfaces 604 for communicating with other devices via a network. Computer 600 also includes one or more input/output devices 605 that enable user interaction with computer 600 (e.g., display, keyboard, mouse, speakers, buttons, etc.).

Processor 601 may include both general and special purpose microprocessors, and may be the sole processor or one of multiple processors of computer 600. Processor 601 may comprise one or more central processing units (CPUs), for example. Processor 601, data storage device 602, and/or memory 603 may include, be supplemented by, or incorporated in, one or more application-specific integrated circuits (ASICs) and/or one or more field programmable gate arrays (FPGAs).

Data storage device 602 and memory 603 each comprise a tangible non-transitory computer readable storage medium. Data storage device 602, and memory 603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 605 may include peripherals, such as a printer, scanner, display screen, etc. For example, input/output devices 605 may include a display device such as a cathode ray tube (CRT) or liquid crystal display (LCD) monitor for displaying information to the user, a keyboard, and a pointing device such as a mouse or a trackball by which the user can provide input to computer 600.

Any or all of the systems and apparatus discussed herein, including lock aggregator service 185, lock service 133, file server 120, file storage 119, and user device 160, and components thereof, including web browser 210, display 270, file server assignment table 320, file server assignment manager 330, lock service polling module 410, file server determination module 440, and conflict resolution rules 430, may be implemented using a computer such as computer 600.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing online services, the method comprising:
    receiving from a first server a first message comprising first information specifying a file;
    transmitting to a plurality of lock services respective second messages comprising second information specifying the file;
    receiving from each of the plurality of lock services assignment information identifying a file server assigned to handle requests related to the specified file;
    applying one or more conflict resolution rules to reconcile conflicts among the assignment information received from the plurality of lock services and to determine an assigned file server assigned to handle requests related to the specified file, wherein the applying one or more conflict resolution rules further comprises applying a majority wins conflict resolution rule to determine the file server assigned to handle requests related to the specified file, if a first number of first lock services identifies a first file server assigned to handle requests related to the specified file and a second number of second lock services identifies a second file server assigned to handle requests related to the specified file;
    transmitting to the first server a third message identifying the file server assigned to handle requests related to the specified file; and
    transmitting to the plurality of lock services a fourth message identifying the file server assigned to handle requests related to the specified file.

2. The method of claim 1, wherein the first message specifies the file and requests information identifying a file server assigned to handle requests related to the specified file.

3. The method of claim 1, further comprising:
    transmitting to five lock services respective second messages comprising second information specifying the file.

4. The method of claim 1, wherein the file comprises one of: a text document, a spreadsheet, a drawing, a design document, a video file, and an audio file.

5. A non-transitory computer readable medium having program instructions stored thereon, the instructions capable of execution by a processor and defining the steps of:
    receiving from a first server a first message comprising first information specifying a file;
    transmitting to a plurality of lock services respective second messages comprising second information specifying the file;
    receiving from each of the plurality of lock services assignment information identifying a file server assigned to handle requests related to the specified file;
    applying one or more conflict resolution rules to reconcile conflicts among the assignment information received from the plurality of lock services and to determine an assigned file server assigned to handle requests related to the specified file, wherein the applying one or more conflict resolution rules further comprises applying a majority wins conflict resolution rule to determine the file server assigned to handle requests related to the specified file, if a first number of first lock services identifies a first file server assigned to handle requests related to the specified file and a second number of second lock services identifies a second file server assigned to handle requests related to the specified file;

transmitting to the first server a third message identifying the file server assigned to handle requests related to the specified file;

transmitting to the plurality of lock services a fourth message identifying the file server assigned to handle requests related to the specified file.

6. The non-transitory computer readable medium of claim 5, wherein the first message specifies the file and requests information identifying a file server assigned to handle requests related to the specified file.

7. The non-transitory computer readable medium of claim 5, further comprising program instructions defining the step of:

transmitting to five lock services respective second messages comprising second information specifying the file.

8. The non-transitory computer readable medium of claim 5, wherein the file comprises one of: a text document, a spreadsheet, a drawing, a design document, a video file, and an audio file.

* * * * *